(No Model.)
C. N. KEENEY.
BEAN ASSORTING MACHINE.
No. 279,953. Patented June 26, 1883.
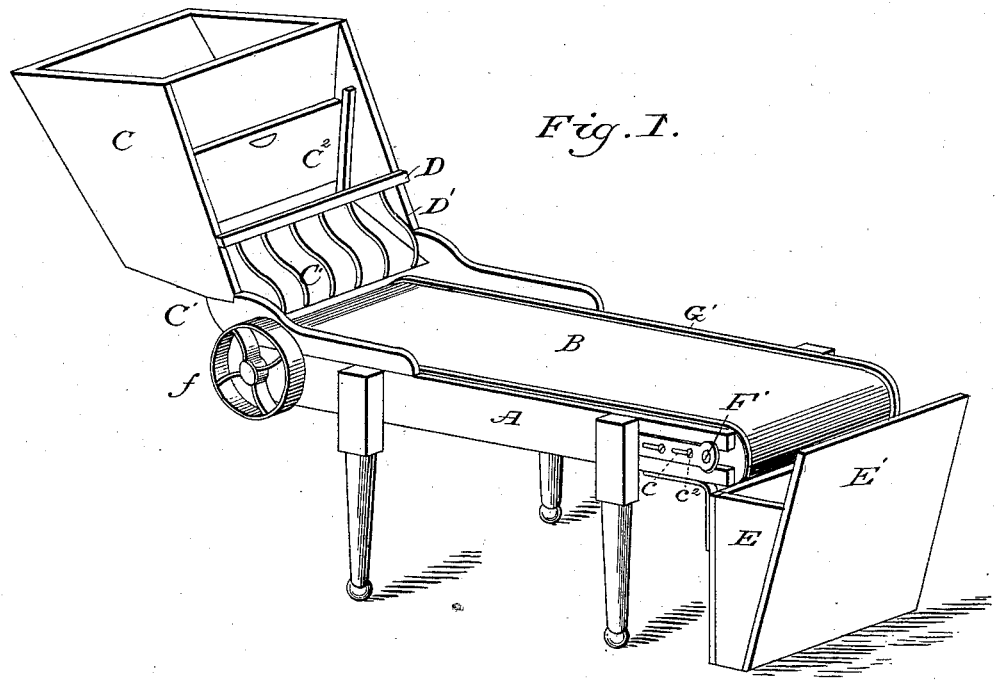
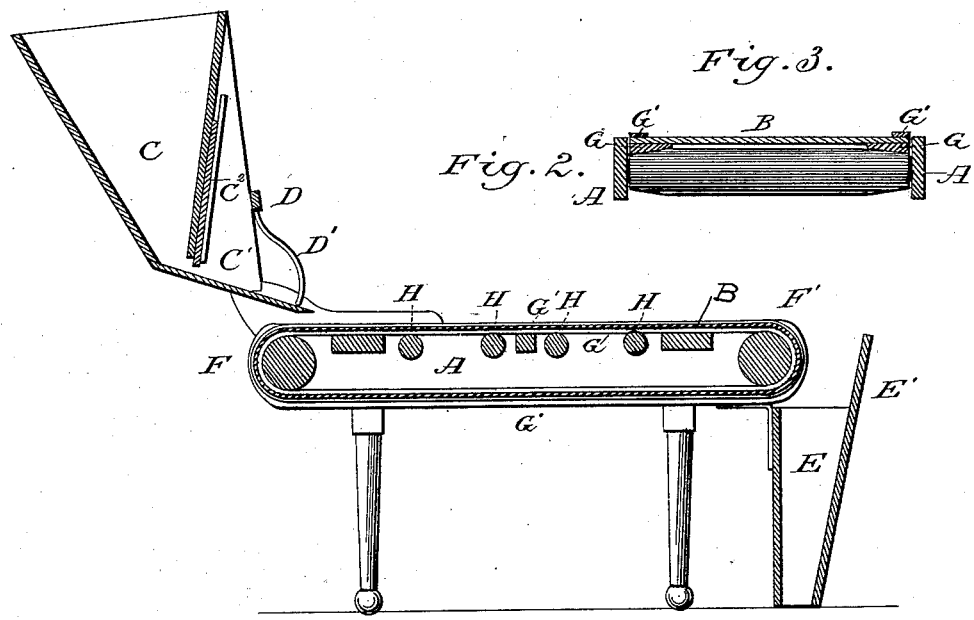
Witnesses.
E. A. Ford
Inventor:
Calvin N. Keeney
By G. W. F. Ford
Atty.

UNITED STATES PATENT OFFICE.

CALVIN N. KEENEY, OF LE ROY, NEW YORK.

BEAN-ASSORTING MACHINE.

SPECIFICATION forming part of Letters Patent No. 279,953, dated June 26, 1883.

Application filed December 20, 1882. (No model.)

*To all whom it may concern:*

Be it known that I, CALVIN N. KEENEY, a citizen of the United States, residing at Le Roy, in the county of Genesee and State of New York, have invented a new and useful Bean-Assorting Machine, of which the following is a specification.

My invention relates to improvements in machinery for aiding in the speedy removal of impurities in beans and other seeds that require hand-picking; and the objects of my improvements are, first, to provide a table (at which the operators are seated) having an endless apron made to move longitudinally over its face; second, to supply a feed-storing bin having means to regulate the flow, so that the beans are automatically and uniformly fed to the carrying-apron; third, the means and manner of distributing the beans over the entire surface of the apron; fourth, in automatically delivering the pure seed into the proper receptacle; and, fifth, to reduce the friction of the revolving belt that carries the beans. I attain these objects by the mechanism illustrated in the accompanying drawings, in which—

Figure 1 is a perspective view taken from the side upon which the driving-pulley is located, and from the foot end of the table. Fig. 2 is a vertical section, showing the inner belts, which carry the canvas apron, as well as the anti-friction rollers for supporting the apron in its revolution and preventing undue friction; and Fig. 3 is an enlarged view, in detail, of the apron, showing the upper and lower belts.

Similar letters refer to similar parts.

The table A is level, and provided with supports in such position as to allow as many operators as are required to be seated at the sides. This table has an endless revolving apron, B, moving over its face in the line of its length, and upon which the uncleaned beans are spread.

C is a bin, which in practice has its mouth upon the floor above, located at the head end of the endless apron or table, and contains the material to be operated upon. This bin is provided with an inclined floor, C', so that the beans are fed to the apron by means of gravity alone.

$C^2$ is a slide at the throat of the bin C, by means of which the flow can be regulated at will.

D is a cross-bar or rake-head secured in position over the inclined throat-floor, and having depending rods D', either curved or straight, which reach within close proximity to the said inclined floor, so as to separate and spread the mass of beans evenly upon the apron below. If desired, this inclined floor may be hinged near the throat of the bin, and an undulating movement given to the lower edge by the use of a rag-wheel placed upon the projecting end of the apron-driving shaft.

E is a discharge-spout, having a raised end, E', to prevent the beans from being thrown over, and by means of which the cleaned beans are conveyed into a receptacle, preferably located upon a floor underneath the one upon which the table is placed.

F F' are rollers turning in suitable bearings at either end of the table, and causing the apron to move over the face. The roller F is provided with a pulley, $f$, by means of which a connection is made with the motive power and the apron driven.

$c$ are bearing-boxes, within which the journals of the roller F' turn. These bearing-boxes, one upon each side of the table, have longitudinal slots $c'$, through which pass screws or securing-bolts $c^2$, and by means of which the slack of the apron may be taken up without unlacing or removing any portion of either the apron or its carrying-belts G, which are placed upon both sides of the apron, and which come in contact with the drive-pulleys upon or made a part of the ends of the rollers F F'.

Upon the face edges of the endless apron are secured in any well-known manner narrow belts or ribs G', to prevent the beans going over the edge while under the process of cleaning.

H are anti-friction rollers pivoted to the sides of the table, intermediate between the end rollers, (see part Fig. 2,) and upon which the loaded apron rests. To prevent the apron-carrying belts running to one side, the face of the rollers at their ends (upon which the said belts run) are made convex in form, as is usually done in drive-pulleys.

In order that the advantages of my improvement may be apparent, I will describe the manner of assorting beans now in common use with the large dealers in this commodity.

Tables of the length desired are provided, and of width sufficient to allow the pickers, seated at their sides, to reach one-half of the way across. Upon these tables the beans which are to be assorted are placed and spread in thin layers, so that the operators may readily see the imperfect ones and other refuse stuff, which are removed, one particle at a time, and thrown into the waste-receptacle near at hand. After the beans on the table have been looked over they are removed by hand and a new batch placed thereon and the same operation repeated.

In my improved device the uncleaned beans are stored in a bin, the throat of which is located at the head of the assorting-table, and when in operation the slide is raised sufficient to allow the required quantity to continually flow upon the revolving apron. The beans are automatically spread the desired thickness, so that the operators, who are seated at the sides of the table, are required to remove the impurities alone. The beans are automatically placed upon the traveling carrier, which takes the place of the table in common use. They are automatically removed from the same and deposited in the storing-bin without aid, further than is found in the machine alone, thus saving a large percentage of labor.

What I claim as my invention, and desire to secure by Letters Patent, is—

1. The combination of the table, the friction-rollers, the canvas-driving rollers, the canvas belt, the driving-belts secured to the under side of the canvas, and the belts secured to the upper side of the canvas, substantially as and for the purpose set forth.

2. The combination of the feed-supplying bin, the inclined delivery-spout, the endless apron, having belts opposite to each other upon its under and upper edges, and the discharge-spout at the foot of the table, arranged and operating substantially as described.

CALVIN N. KEENEY.

Witnesses:
BUTLER WARD,
G. W. FORD.